No. 649,026. Patented May 8, 1900.
J. R. WOOD.
DOG COLLAR.
(Application filed Apr. 6, 1899.)
(No Model.)
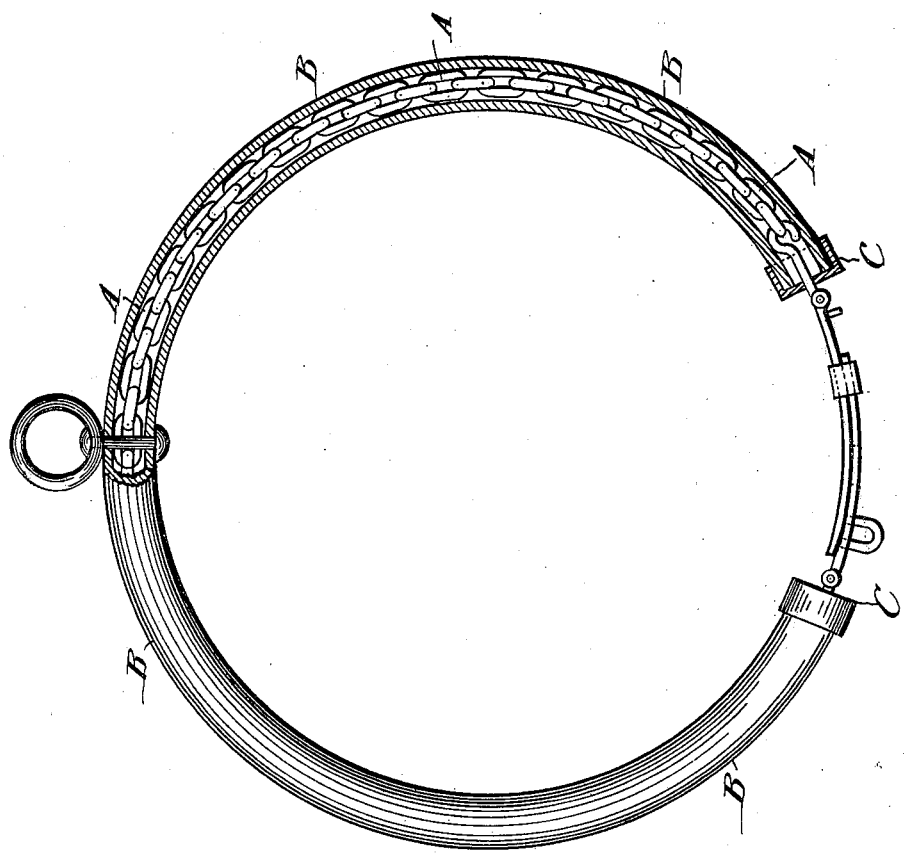
Witnesses:
G. S. Noble.
J. Buehler
Inventor,
James Robert Wood
by B. Singer
Att'y.
THE NORRIS PETERS CO., PHOTO-LITHO., WASHINGTON, D. C.

UNITED STATES PATENT OFFICE.

JAMES ROBERT WOOD, OF GLASGOW, SCOTLAND.

DOG-COLLAR.

SPECIFICATION forming part of Letters Patent No. 649,026, dated May 8, 1900.

Application filed April 6, 1899. Serial No. 711,918. (No model.)

*To all whom it may concern:*

Be it known that I, JAMES ROBERT WOOD, a subject of the Queen of Great Britain, and a resident of Glasgow, Scotland, have invented Improvements in Animal-Collars, (for which I have obtained a patent in Great Britain, No. 19,653, bearing date September 16, 1898,) of which the following is a specification.

This invention has for its object to provide a collar for animals which, though retaining its strength, is very much more comfortable to the animal than those generally in use, allowing at the same time greater ventilation between the neck and the collar.

In order that my invention may be properly understood and more readily carried into effect, I have hereunto appended a drawing showing, partly in section and partly in elevation, a collar constructed in accordance with my invention.

In carrying out my invention I have a chain A, of brass, steel, or other suitable metal or material, which is incased in a tube B, of rubber or other soft, pliable, and elastic material. Each end of the tube B is provided with a cap or cover C, through which the ends of the chain A protrude and to which is secured a link or catch, whereby the ends of the collar can be joined together and locked by means of a padlock or otherwise when placed around the animal's neck. The tube B protects the animal's hair from contact with the rough chain and therefore saves the rubbing off of the hair.

Having fully described my invention, what I claim, and desire to secure by Letters Patent, is—

As a new article of manufacture, an animal-collar formed of a flexible metallic cable inclosed within a tube of soft, pliable and elastic material, and having its ends covered by suitable caps, and connected by a catch, substantially in the manner described.

In testimony whereof I affix my signature in presence of two witnesses.

JAMES ROBERT WOOD.

Witnesses:
JOHN LIDDLE,
EDITH MARY EDMONDSTONE.